United States Patent
Stiller et al.

(10) Patent No.: US 11,292,478 B2
(45) Date of Patent: Apr. 5, 2022

(54) METHOD AND CONTROL UNIT FOR DETECTING DROWSINESS OF A DRIVER FOR A DRIVER ASSISTANCE SYSTEM FOR A VEHICLE

(71) Applicant: Robert Bosch GmbH, Stuttgart (DE)

(72) Inventors: Benedikt Stiller, Cleebronn (DE); Stefan Hoefle, Gemmingen (DE); Valentin Loeffelmann, Dielheim (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 16/839,134

(22) Filed: Apr. 3, 2020

(65) Prior Publication Data
US 2020/0317211 A1    Oct. 8, 2020

(30) Foreign Application Priority Data

Apr. 5, 2019    (DE) .......................... 102019204892.7

(51) Int. Cl.
*B60W 40/08*    (2012.01)
*G08B 21/06*    (2006.01)

(52) U.S. Cl.
CPC ............ *B60W 40/08* (2013.01); *G08B 21/06* (2013.01); *B60W 2520/10* (2013.01); *B60W 2540/223* (2020.02); *B60W 2540/229* (2020.02); *B60W 2540/30* (2013.01); *B60W 2552/05* (2020.02)

(58) Field of Classification Search
None
See application file for complete search history.

(56) References Cited

U.S. PATENT DOCUMENTS

| | | | | |
|---|---|---|---|---|
| 6,661,345 | B1* | 12/2003 | Bevan | G08B 21/06 340/575 |
| 9,198,575 | B1* | 12/2015 | Blacutt | G06K 9/00845 |
| 2005/0073136 | A1* | 4/2005 | Larsson | A61B 5/163 280/735 |
| 2015/0216466 | A1* | 8/2015 | Kronberg | G06F 17/18 702/19 |
| 2016/0001781 | A1* | 1/2016 | Fung | B60K 28/02 701/36 |

(Continued)

FOREIGN PATENT DOCUMENTS

| | | |
|---|---|---|
| DE | 10355221 A1 | 6/2005 |
| DE | 102006051930 A1 | 5/2008 |

(Continued)

*Primary Examiner* — David P. Merlino
(74) *Attorney, Agent, or Firm* — Norton Rose Fulbright US LLP; Gerard Messina (57) ABSTRACT

A method for detecting drowsiness of a driver for a driver assistance system of a vehicle includes reading in at least a first indicator signal that represents a first drowsiness parameter of the driver determined by a first drowsiness-detection device of the vehicle, and a second indicator signal that represents a second drowsiness parameter of the driver determined by a second drowsiness-detection device of the vehicle, and optionally a third indicator signal that represents a third drowsiness parameter of the driver determined by a third drowsiness-detection device of the vehicle; ascertaining validities of the indicator signals; and determining a drowsiness signal that represents the detected drowsiness of the driver utilizing the indicator signals and the validities.

13 Claims, 4 Drawing Sheets

(56) References Cited

U.S. PATENT DOCUMENTS

| | | | |
|---|---|---|---|
| 2016/0104486 A1 | 4/2016 | Penilla et al. | |
| 2016/0137059 A1* | 5/2016 | Mader | B60W 40/08 340/575 |
| 2017/0001520 A1* | 1/2017 | Nemat-Nasser | G08B 21/06 |
| 2017/0242433 A1* | 8/2017 | Ochiai | G01C 21/3484 |
| 2018/0365961 A1* | 12/2018 | Katsuhara | G08B 21/06 |
| 2019/0121356 A1* | 4/2019 | Migneco | A61B 5/7264 |
| 2019/0147267 A1* | 5/2019 | Aizawa | G08G 1/0962 340/576 |
| 2019/0155279 A1* | 5/2019 | Tayama | G08G 1/0962 |
| 2020/0047765 A1* | 2/2020 | Kishi | G05D 1/0088 |

FOREIGN PATENT DOCUMENTS

| | | |
|---|---|---|
| DE | 102011117850 A1 | 5/2013 |
| DE | 102012024706 A1 | 6/2013 |
| DE | 102012001741 A1 | 8/2013 |
| DE | 102015010284 A1 | 3/2016 |

\* cited by examiner

METHOD AND CONTROL UNIT FOR DETECTING DROWSINESS OF A DRIVER FOR A DRIVER ASSISTANCE SYSTEM FOR A VEHICLE

CROSS-REFERENCE TO RELATED APPLICATIONS

The present application claims priority under 35 U.S.C. § 119 to DE 10 2019 204 892.7 filed in the Federal Republic of Germany on Apr. 5, 2019, the content of which is hereby incorporated by reference herein in its entirety.

FIELD OF THE INVENTION

The present approach is based on an apparatus or a method according to the species defined in the independent claims. A computer program is also a subject matter of the present approach.

BACKGROUND

There are various methods for ascertaining drowsiness of a vehicle driver.

US 2016/0104486 A1 and DE 10 2015 010 284 A1 each describes a method for operating an assistance device of a vehicle.

SUMMARY

Against this background, the approach presented here introduces a method for detecting drowsiness of a driver for a driver assistance system for a vehicle, a control unit that uses this method, and a corresponding computer program.

Advantages achievable with the approach presented lie in the creation of an especially reliable driver-drowsiness detection.

A method for detecting drowsiness of a driver for a driver assistance system for a vehicle includes a read-in step, an ascertainment step, and a step of determining a drowsiness signal. In the read-in step, at least a first indicator signal that represents a first drowsiness parameter of the driver determined by a first drowsiness-detection device of the vehicle, a second indicator signal that represents a second drowsiness parameter of the driver determined by a second drowsiness-detection device of the vehicle, and optionally a third indicator signal that represents a third drowsiness parameter of the driver determined by a third drowsiness-detection device of the vehicle are read in. In the ascertainment step, a first validity of the first indicator signal, a second validity of the second indicator signal, and optionally a third validity of the third indicator signal are ascertained. In the determination step, the drowsiness signal that represents the detected drowsiness of the driver is determined, utilizing the first indicator signal, the second indicator signal, optionally the third indicator signal, the first validity, the second validity, and optionally the third validity.

For example, one drowsiness parameter can indicate a state or degree of drowsiness of the driver. One drowsiness parameter, for instance, can indicate whether the driver is judged to be very tired, somewhat tired, or not tired. A validity of an indicator signal can indicate a probability for correctness of the drowsiness parameter represented by the indicator signal. The individual drowsiness parameters can differ, since they can be determined in a variety of ways. Accordingly, different validities can be assigned to the drowsiness parameters. In the ascertainment step, the first validity, the second validity, and additionally or alternatively the third validity can be ascertained, e.g., utilizing a function test of the first, second, and additionally or alternatively third drowsiness-detection device. Thus, for example, if the function test indicates a malfunction of one of the drowsiness-detection devices, the validity of the indicator signal of this drowsiness-detection device can then be ascertained accordingly, e.g., can be classified as low. For instance, an operational function of a camera of a drowsiness-detection device can be tested in the function test, and additionally or alternatively, a quality of a camera image of the camera can be checked. Advantageously, the validity of the individual drowsiness parameters can be inferred very accurately by way of such a function test.

The method presented here advantageously uses a combination of several results of different drowsiness-detection devices as well as a validation of the results, and thus, a check of the validity of these results, before a final decision about the drowsiness of the driver is made in the step of determining the drowsiness signal. Thus, the drowsiness of the driver recognized in the step of determining the drowsiness signal is very meaningful and reliable as a validated overall result. In this context, at least two, but also three, four, or more methods can be combined with each other, for example.

Moreover, the method can have a step of determining the first indicator signal and additionally or alternatively the second indicator signal and additionally or alternatively the third indicator signal. In so doing, a first of the indicator signals can be determined utilizing a head signal that can relate to the eyes, the face, and/or the attitude of the head of the driver. For instance, the head signal can represent an eye movement, an eyelid opening, blinking events, a head position, a viewing direction, and/or a head orientation of the driver. Additionally or alternatively, a second of the indicator signals can be determined utilizing a steering signal that represents a steering behavior of the driver or of the vehicle. Additionally or alternatively, a third of the indicator signals can be determined utilizing a driving-environment signal that represents a driving-environment situation. The step of determining the first indicator signal and additionally or alternatively the second indicator signal and additionally or alternatively the third indicator signal can be carried out prior to the read-in step, e.g., by the respective drowsiness-detection device. Therefore, the first drowsiness-detection device can be designed to determine the first drowsiness parameter, which can be understood as a sensor value or result of an evaluation of the first drowsiness-detection device, utilizing eye movements of the driver. To that end, the first drowsiness-detection device can have a camera. The second drowsiness-detection device can be designed to determine the second drowsiness parameter, which can be understood as a sensor value or result of an evaluation of the second drowsiness-detection device, utilizing steering adjustments, e.g., at least one set steering-wheel angle or a steering-wheel angular velocity. The third drowsiness-detection device can be designed to determine the third drowsiness parameter, which can be understood as a sensor value or result of an evaluation of the third drowsiness-detection device, utilizing a driving-environment situation and/or a driver activity. For example, the third drowsiness parameter can be determined using driving-environment situations such as environmental factors and additionally or alternatively a driving time and additionally or alternatively a driver activity. In this context, a driver activity can include steering, braking, accelerating, actuating switches, pressing buttons, or telephoning.

According to an example embodiment, the method has a receiving step in which a driving-situation signal is received that indicates an automated vehicle operation and additionally or alternatively a present driving speed and additionally or alternatively a type of road, the step of determining the drowsiness signal being carried out as a function of the driving-situation signal. This ensures that the drowsiness is only determined when it is necessary.

In the step of determining the drowsiness signal, the drowsiness signal can be determined utilizing the first indicator signal if the first validity satisfies a first condition, and can be determined utilizing the second indicator signal if the second validity satisfies a second condition, and can be determined utilizing the third indicator signal if the third validity satisfies a third condition. The first and additionally or alternatively second and additionally or alternatively third condition can be understood to be a setpoint value or a threshold value for the first and additionally or alternatively second and additionally or alternatively third validity. This setpoint value or threshold value can be utilized in the step of determining the drowsiness signal, for a comparison to the validities. Thus, an indicator signal whose validity deviates from the setpoint value or lies above or below the threshold value can be disregarded in the step of determining the drowsiness signal, for example. In other words, in the step of determining the drowsiness signal, only those indicator signals are considered which satisfy their respective condition, e.g., lie in a setpoint range determined for them or do not exceed or fall below their threshold value. Therefore if, according to an example embodiment, only reliable indicator signals as well as validities are considered in the step of determining the drowsiness signal, a falsified overall result can be avoided.

In the step of determining the drowsiness signal, the drowsiness signal can be determined utilizing the first indicator signal weighted as a function of the first validity and utilizing the second indicator signal weighted as a function of the second validity and utilizing the third indicator signal weighted as a function of the third validity. Thus, in determining the drowsiness signal, those drowsiness parameters which were classified as less valid are also given less weight than those drowsiness parameters which were classified as more valid. Advantageously, the recognized drowsiness can therefore be very meaningful as an overall result weighted according to validities.

However, in the step of determining the drowsiness signal, a mean value can also be formed from the first indicator signal and the second indicator signal and the third indicator signal in order to determine the drowsiness signal. This mean value can be determined using the weighted indicator signals. However, the mean value can also be determined in an example embodiment of the method in which the validities of the indicator signals are not weighted, but rather, after checking their validities, the indicator signals are either used or ruled out for determining the drowsiness signal.

Additionally or alternatively, in the step of determining the drowsiness signal, the drowsiness signal can be determined utilizing a machine-learned determination rule.

In addition, it is advantageous if the method has a transmitting step in which a warning signal is output to the driver if, in the step of determining the drowsiness signal, the recognized drowsiness of the driver is detected is or was classified as critical. In this case, the recognized drowsiness of the driver can be compared, for example, in the form of a validated drowsiness parameter, to a setpoint drowsiness parameter or a setpoint drowsiness threshold value, and the warning signal can be output as a function of a comparison result. Thus, a driver can already be alerted in time prior to dozing off.

For example, this method can be implemented in software or hardware or in a mixed form of software and hardware, e.g., in a control unit.

The approach introduced here also provides a control unit which is designed to carry out, control, or implement the steps of a variant of a method presented here, in suitable devices. An object underlying the approach can be achieved quickly and efficiently by this embodiment variant of the approach in the form of a control unit, as well.

To that end, the control unit can have at least one arithmetic logic unit for the processing of signals or data, at least one memory unit for storing signals or data, at least one interface to a sensor or an actuator for reading in sensor signals from the sensor or for the output of control signals to the actuator, and additionally or alternatively at least one communication interface for the read-in or output of data which is embedded into a communication protocol. The arithmetic logic unit can be a signal processor, a microcontroller, or the like, for example, while the memory unit can be a flash memory, an EPROM, or a magnetic memory unit. The communication interface can be adapted to read in or output data in wireless fashion and additionally or alternatively in line-conducted fashion, a communication interface which is able to read in or output line-conducted data having the capability to read in this data electrically or optically from a corresponding data-transmission line, for example, or to output it into a corresponding data-transmission line.

In the present case, a control unit can be understood to be an electrical device that processes sensor signals and outputs control signals and additionally or alternatively data signals as a function thereof. The control unit can have an interface that can be implemented in hardware and additionally or alternatively in software. If implemented in hardware, the interfaces can be part of what is referred to as a system ASIC, for example, that includes a wide variety of functions of the control unit. However, it is also possible that the interfaces are separate integrated circuits or are made up at least partially of discrete components. If implemented in software, the interfaces can be software modules that are present in a microcontroller, for example, in addition to other software modules.

In an example embodiment, a method for detecting drowsiness of a driver for a driver assistance system for a vehicle is controlled by the control unit. To that end, for example, the control unit is able to access sensor signals such as a first indicator signal, a second indicator signal, and a third indicator signal. The control is accomplished via actuators such as a read-in device for reading in the indicator signals, an ascertainment device for ascertaining respective validities of the specified indicator signals, and a determination device for determining a drowsiness signal that represents the recognized drowsiness of the driver, utilizing the cited indicator signals and their validities.

An example embodiment of the present invention is directed to a computer-program product or computer program having program code that can be stored on a machine-readable carrier or storage medium such as a semiconductor memory, a hard disk memory, or an optical memory and is used to carry out, implement, and additionally or alternatively to control the steps of the method according to one of the example embodiments described above or below, especially when the program product or program is executed on a computer or an apparatus.

Example embodiments of the approach presented here are represented in the drawings and explained in greater detail in the following description.

DETAILED DESCRIPTION

In the following description of advantageous example embodiments of the present approach, the same or similar reference numerals are used for the similarly functioning elements shown in the various figures, a repeated description of these elements being omitted.

Figure 1:
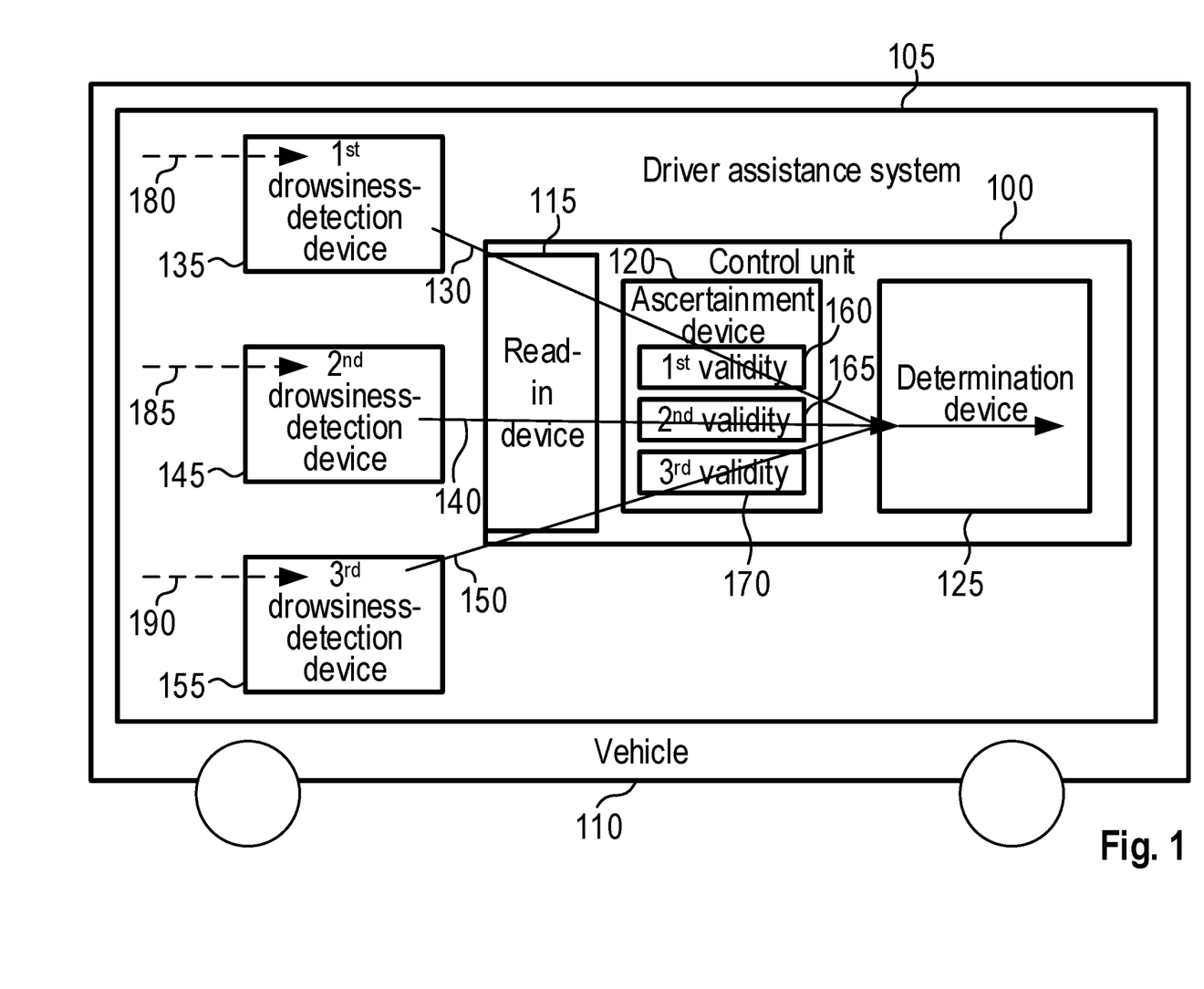
FIG. 1 is a block diagram of a control unit for detecting drowsiness of a driver for a driver assistance system of a vehicle according to an example embodiment of the present invention.

FIG. 1 is a block diagram of a control unit 100 for detecting drowsiness of a driver for a driver assistance system 105 of a vehicle 110 according to an example embodiment. Merely by way of example, control unit 100 according to this example embodiment is accommodated in driver assistance system 105 of vehicle 110 or is implemented in driver assistance system 105. Control unit 100 is designed to detect drowsiness of the driver of vehicle 110. To that end, control unit 100 has at least one read-in device 115, one ascertainment device 120, and one determination device 125. Read-in device 115 is designed to read in a first indicator signal 130 that represents a first drowsiness parameter of the driver determined by a first drowsiness-detection device 135 of vehicle 110. In addition, read-in device 115 is designed to read in a second indicator signal 140 that represents a second drowsiness parameter of the driver determined by a second drowsiness-detection device 145 of vehicle 110. Moreover, read-in device 115 is designed to read in a third indicator signal 150 that represents a third drowsiness parameter of the driver determined by a third drowsiness-detection device 155 of vehicle 110. Ascertainment device 120 is designed to ascertain a first validity 160 of first indicator signal 130 and a second validity 165 of second indicator signal 140 and a third validity 170 of third indicator signal 150. Determination device 125 is designed to determine a drowsiness signal 175 that represents the detected drowsiness of the driver, utilizing first indicator signal 130, second indicator signal 140, third indicator signal 150, first validity 160, second validity 165, and third validity 170. According to this example embodiment, three drowsiness-detection devices 135, 145, 155 are combined with one another. Alternatively, only two of indicated drowsiness-detection devices 135, 145, 155 or more than three drowsiness-detection devices 135, 145, 155 can also be combined with one another.

According to an example embodiment, first drowsiness-detection device 135 is designed to detect drowsiness of the driver, utilizing at least one head signal 180 that represents an eye movement of the driver, and to make it available in the form of first indicator signal 130. Head signal 180 can be derived from features that relate to the eyes, the face, and/or the attitude of the head of the driver. For example, head signal 180 indicates an eye movement, an eyelid opening, a viewing direction, or blinking events of the driver. Additionally or alternatively, head signal 180 indicates a head position and/or a head orientation of the driver. According to an example embodiment, second drowsiness-detection device 145 is designed to detect drowsiness of the driver, utilizing at least one steering signal 185 that represents a steering behavior of the driver or of vehicle 110, and to make it available in the form of second indicator signal 140. Third drowsiness-detection device 155 according to this example embodiment is designed to detect drowsiness of the driver, utilizing at least one driving-environment signal 190 that represents a driving-environment situation, and to make it available in the form of third indicator signal 150. Additionally or alternatively, other drowsiness-detection devices can be utilized. All or at least one of drowsiness-detection devices 135, 145, 155 is/are part of control unit 100.

Therefore, according to this example embodiment, first drowsiness-detection device 135 is designed to determine the first drowsiness parameter, utilizing features relating to the head of the driver. According to an example embodiment, to that end, first drowsiness-detection device 135 has at least one camera or another suitable sensor or is designed to read in signals from a camera. According to this example embodiment, second drowsiness-detection device 145 is designed to determine the second drowsiness parameter, utilizing steering adjustments, e.g., at least one set steering-wheel angle or a steering-wheel angular velocity of vehicle 110. According to this example embodiment, third drowsiness-detection device 155 is designed to determine the third drowsiness parameter, utilizing driving-environment situations such as environmental factors and/or a time of day and/or a driving time and/or a driver activity.

According to this example embodiment, determination device 125 is designed to determine drowsiness signal 175 utilizing first indicator signal 130 if first validity 160 satisfies a first condition, utilizing second indicator signal 140 to determine it if second validity 165 satisfies a second condition, and utilizing third indicator signal 150 to determine it if third validity 170 satisfies a third condition. According to this example embodiment, to that end, determination device 125 is designed to compare first validity 160 to a setpoint value or threshold value, compare second validity 165 to a setpoint value or threshold value, and compare third validity 170 to a setpoint value or threshold value. According to an example embodiment, the setpoint or threshold values are stored in control unit 100 or are able to be read in by control unit 100. According to an optional example embodiment, in order to determine drowsiness signal 175, determination device 125 uses only those indicator signals 130, 140, 150 whose validities 160, 165, 170 satisfy their respective condition, for example, lie in a setpoint range determined for them or do not exceed or fall below their threshold value.

Additionally or alternatively, determination device 125 according to this example embodiment is designed to determine drowsiness signal 175 utilizing first indicator signal 130 weighted as a function of first validity 160 and utilizing second indicator signal 140 weighted as a function of second validity 165 and utilizing third indicator signal 150 weighted as a function of third validity 170. According to an optional example embodiment, to that end, control unit 100 is designed to weight first validity 160 and/or second validity 165 and/or third validity 170, e.g., as a function of a result of validity 160, 165, 170 ascertained in each instance. According to an example embodiment, in so doing, control unit 100 gives more weight to those indicator signals 130, 140, 150 whose validities 160, 165, 170 were ascertained by ascertainment device 120 as being more valid, than to those indicator signals 130, 140, 150 whose validities 160, 165, 170 were ascertained as being less valid.

Additionally or alternatively, determination device 125 according to an example embodiment is designed to form a mean value from first indicator signal 130 and second indicator signal 140 and third indicator signal 150, in order to determine drowsiness signal 175. A suitable averaging rule can be applied for that purpose.

Additionally or alternatively, determination device 125 according to this example embodiment is designed to determine drowsiness signal 175, utilizing a machine-learned determination rule. It is possible to employ known methods of artificial intelligence for this purpose.

In the following, details as well as functions of control unit 100 are described on the basis of several example embodiments. Control unit 100 combines a drowsiness assessment as a function of the situation and a drowsiness assessment based on eye movements. If a camera image of a camera directed toward the face of the driver is not trustworthy, according to an example embodiment, a drowsiness assessment based on a steering behavior is included by control unit 100.

According to an example embodiment, at least two, in any combination, of the methods of a drowsiness-detection device specified below are included by control unit 100:
- a drowsiness assessment based on a steering behavior of the driver, e.g., using an evaluation of steering-wheel angles;
- a drowsiness assessment based on camera images, e.g., using an evaluation of facial features or facial characteristics such as an opening state of an eyelid and/or a head posture and/or a viewing direction of the driver;
- a drowsiness assessment based on the driving situation, e.g., taking into account a time of day and/or a driving time;
- a drowsiness assessment based on a lane-position detection, e.g., using a front camera aligned forward on the vehicle; and/or
- a drowsiness assessment based on other measuring methods such as elektroencephalography (EEG) and/or a skin temperature of the driver.

Unlike in the case of known drowsiness-detection devices, control unit 100 described here not only combines results of various drowsiness assessments, but also takes an evaluation of a validity of the individual results into account in the final assessment. This is important, since the individual drowsiness-detection devices do not function equally well in all possible scenarios. Each of the methods named has weaknesses. For example, design approaches for detecting drowsiness based on steering-wheel angles are not meaningful if a driver-assistance device for partially automated or highly automated driving is active, since in such a case, the driver alone is by no means controlling or steering the vehicle. Thus, the driver can either be assisted by the driver-assistance device, causing discrepancies in the drowsiness detection, or possibly the driver is not even involved in the driving at all. Thus, a poor or falsified result can occur. In certain situations, cameras that are directed toward the face of the driver can take poor images or have problems in the image processing, e.g., because of solar radiation, reflections, individual facial features, and/or obstruction of a camera disposed in the passenger compartment or obstruction of the face, in addition to driver size and seat position. Thus, a poor or falsified result can also be obtained. Situation-based drowsiness assessments can also be incorrect if the drowsiness of the driver deviates from a statistical average, e.g., if the driver is a night worker or a commercial driver. Thus, a poor or falsified result can also come about. Lane-based drowsiness assessments can have problems if there is no lane marking. Thus, a poor or falsified result can also be obtained.

For this reason, control unit 100 is designed advantageously to determine the validities of the results, in order to give less weight to or even to rule out such poor or falsified results in determining a final result.

In summary, control unit 100 thus combines the drowsiness assessments of a plurality of drowsiness-detection devices 135, 145, 155, taking into account the individual validities of the drowsiness assessments, in order to balance weaknesses of individual drowsiness-detection devices 135, 145 155 and to improve an overall result of the drowsiness assessment in the form of drowsiness signal 175.

Control unit 100 combines at least two methods for drowsiness detection of drowsiness-detection devices 135, 145, 155 based on individual validities 160, 165, 170 of individual indicator signals 130, 140, 150. In an example embodiment, if the camera image of the camera is not good, corresponding first and/or second indicator signal 130, 140 is/are not considered in determining drowsiness signal 175, and/or if a driver-assistance device is active, second indicator signal 140, which is then no longer meaningful, is disregarded in determining drowsiness signal 175 (see also FIG. 2). This permits a particularly good final result, since only those results of drowsiness-detection devices 135, 145, 155 are combined have the highest validities.

Figure 2:
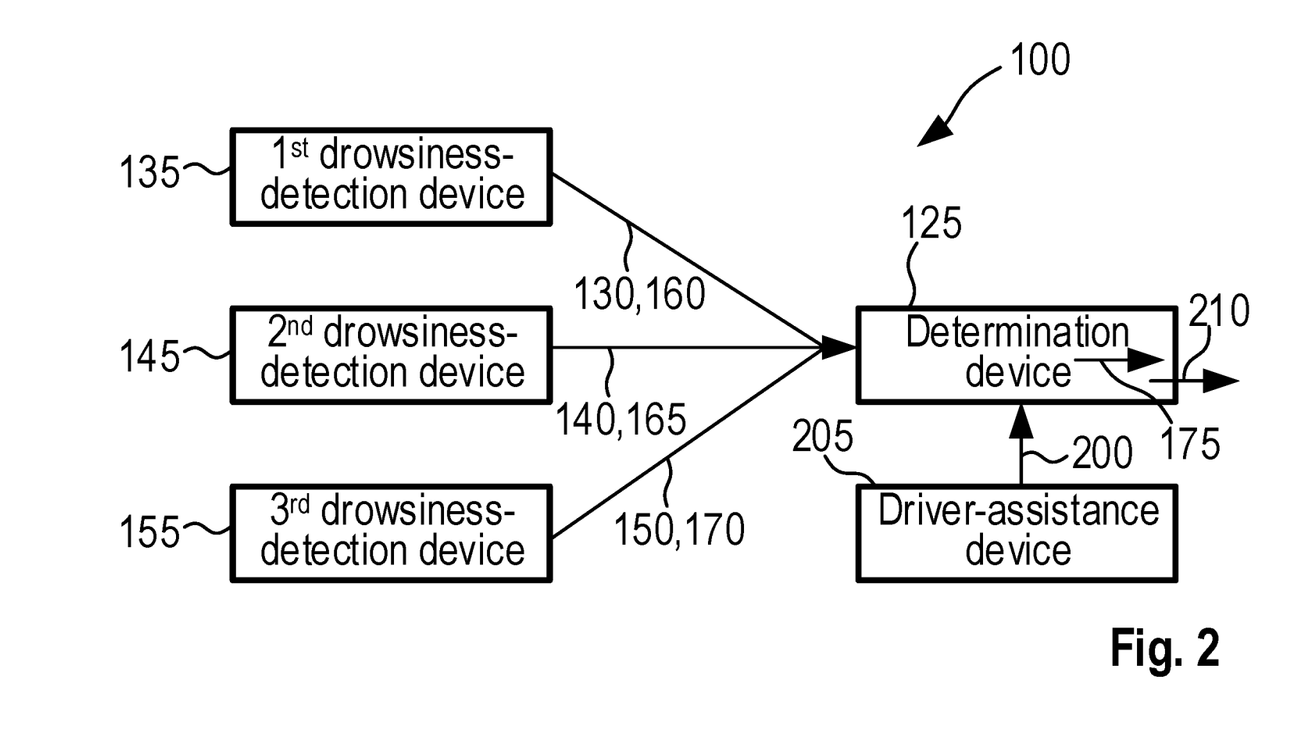
FIG. 2 is a block diagram of a control unit according to an example embodiment of the present invention.

FIG. 2 is a block diagram of a control unit 100 according to an example embodiment. It can be control unit 100 described using FIG. 1. According to this example embodiment, control unit 100 is designed to receive a driving-situation signal 200 that indicates an automated vehicle operation and/or a present driving speed and/or a type of road. Determination device 125 is designed to determine drowsiness signal 175 as a function of driving-situation signal 200. Control unit 100 according to an example embodiment receives driving-situation signal 200 from a driver-assistance device 205 of the vehicle. According to an example embodiment, driver-assistance device 205 is also part of control unit 100.

According to an example embodiment, determination device 125 does not consider second indicator signal 140 (steering behavior) when determining drowsiness signal 175 if driving-situation signal 200 indicates partially or highly automated operation of the vehicle. Additionally or alternatively, determination device 125 disregards second indicator signal 140 in determining drowsiness signal 175 if driving-situation signal 200 indicates a speed below a threshold value. Thus, for example, second indicator signal 140 can be left out of account if the driving speed corresponds to a walking speed. According to this example embodiment, drowsiness signal 175 is thus determined based on the driving situation and validities 160, 165, 170 of all indicator signals 130, 140, 150. According to an example embodiment, the combination is realized using a linear model, for example, an average value or a weighted average value is determined by determination device 125. According to an example embodiment, the combination is realized using one or more selection methods, for example, determination device 125 outputs a warning signal 210 that produces a warning perceivable to the driver if two of indicator signals 130, 140, 150 are ascertained as valid. According to an example embodiment, the combination is realized using at least one machine learning process for combining the methods. In this case, according to an example embodiment, control unit 100 learns that or how the driving situation influences the overall result.

In a further exemplary application, control unit 100 reads in first indicator signal 130 and third indicator signal 150. Only if ascertainment device 120 ascertains that the camera is not providing any trustworthy information, is second indicator signal 140 read in and used for determining drowsiness signal 175. According to an example embodiment, second indicator signal 140 is only read in, however, if the driver alone is actively controlling vehicle 110, no partially or highly automated vehicle operation being set. The drowsiness detection based on the steering behavior is used in this application case as a reserve drowsiness detection. This permits a more stable drowsiness detection in situations where the drowsiness parameter of first drowsiness-detection device 135 representing the eye movements of the driver and/or the drowsiness parameter of third drowsiness-detection device 155 representing the situation is/are ascertained as not valid. In this application, only in certain driving situations is second indicator signal 140 taken into account in the final drowsiness determination; thus, only when the camera has problems.

A function of control unit 100 presented here can be identified using an analysis of the final result provided by drowsiness signal 175 if one of drowsiness-detection devices 135, 145, 155 was manipulated, e.g., the camera was deactivated or blocked.

Figure 3:
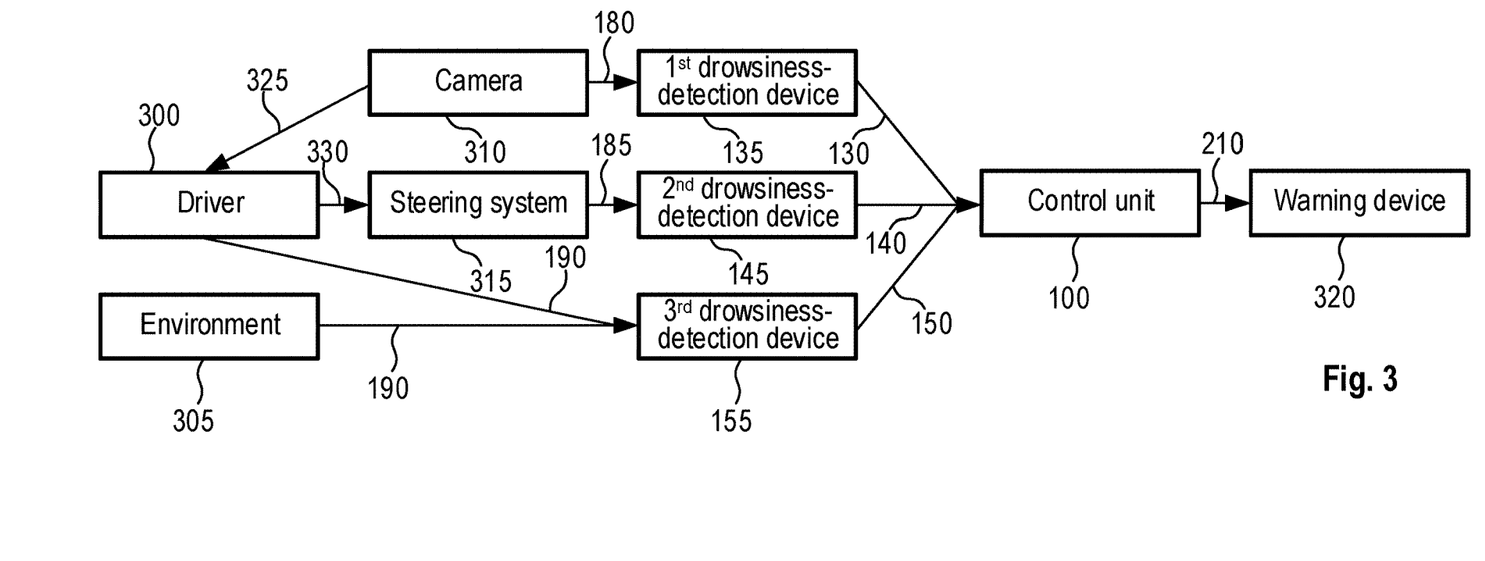
FIG. 3 is a block diagram of a control unit according to an example embodiment of the present invention.

FIG. 3 is a block diagram of a control unit 100 according to an example embodiment. It can be control unit 100 described using FIG. 1 or 2. Also shown schematically are driver 300 of the vehicle, environment 305, camera 310 of the vehicle, a steering system 315 of the vehicle, and a warning device 320 of the vehicle. FIG. 3 shows an overview of a signal flow for detecting the drowsiness of driver 300.

According to this example embodiment, camera 310 is directed toward the face of driver 300 and is designed to acquire facial signals 325 that are then able to be read in in the form of head signals 180 by first drowsiness-detection device 135. Steering system 315 is designed to acquire steering-behavior signals 330 of the driver that are then able to be read in in the form of steering signals 185 by second drowsiness-detection device 145. Third drowsiness-detection device 155 is designed to acquire driving-environment signals 190 from driver 300 that represent a driver activity, for example, and/or to acquire driving-environment signals 190 from environment 305 that represent a time of day and/or a driving time, for example.

According to this example embodiment, control unit 100 is designed to output warning signal 210 to warning device 320; and is designed, in response to warning signal 210, to warn driver 300 if the drowsiness signal indicates the detected drowsiness of the driver that is or was classified as critical. To that end, control unit 100 is designed to compare the recognized drowsiness of the drowsiness signal to a critical drowsiness value and/or a critical threshold value that, according to an example embodiment, is stored or read in.

Figure 4:
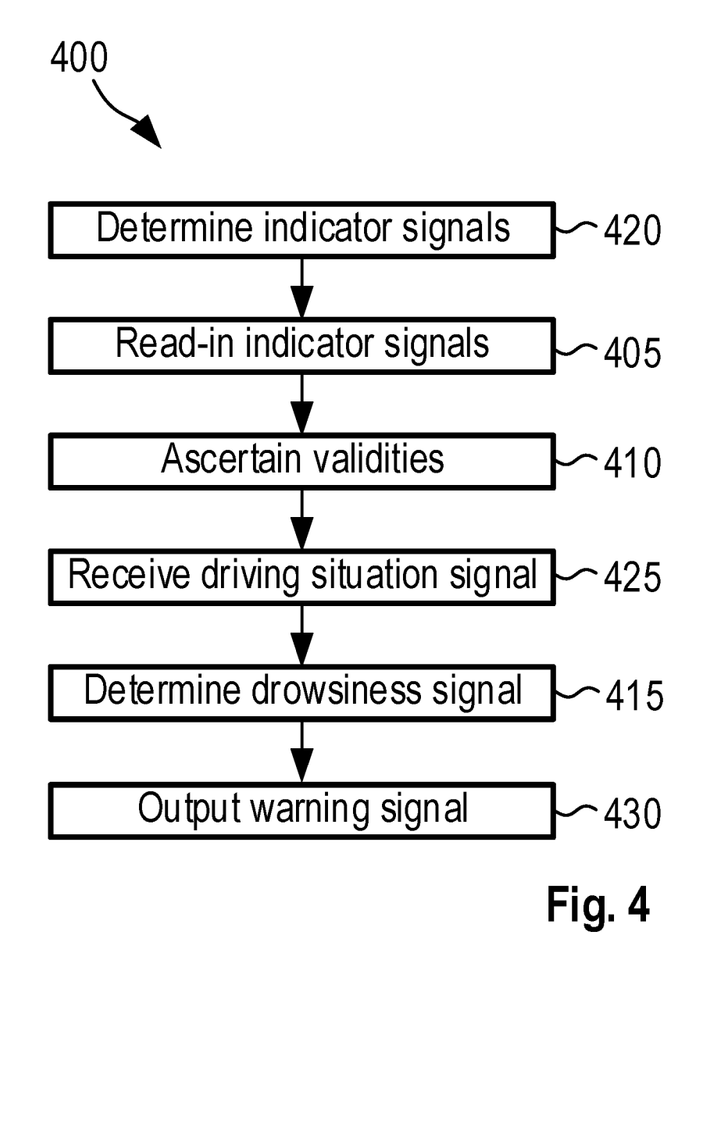
FIG. 4 is a flowchart of a method for detecting drowsiness of a driver for a driver assistance system of a vehicle according to an example embodiment of the present invention.

FIG. 4 is a flowchart of a method 400 for detecting drowsiness of a driver for a driver assistance system for a vehicle according to an example embodiment. It can be a method 400 that is executable or controllable by one of the control units described with reference to one of the previous figures.

Method 400 includes a read-in step 405, an ascertainment step 410, and a step 415 of determining a drowsiness signal. In read-in step 405, at least a first indicator signal that represents a first drowsiness parameter of the driver determined by a first drowsiness-detection device of the vehicle, a second indicator signal that represents a second drowsiness parameter of the driver determined by a second drowsiness-detection device of the vehicle, and a third indicator signal that represents a third drowsiness parameter of the driver determined by a third drowsiness-detection device of the vehicle are read in. In ascertainment step 410, a first validity of the first indicator signal and a second validity of the second indicator signal, and a third validity of the third indicator signal are ascertained. In determination step 415, a drowsiness signal that represents the detected drowsiness of the driver is determined utilizing the first indicator signal, the second indicator signal, the third indicator signal, the first validity, the second validity, and the third validity.

According to this example embodiment, in addition, method 400 has an optional step 420 of determining the first and/or second and/or third indicator signal, and/or an optional receiving step 425, and/or an optional transmitting step 430. In step 420 of determining the first and/or second and/or third indicator signal, the first indicator signal is determined utilizing a head signal that represents an eye movement of the driver, and/or the second indicator signal is determined utilizing a steering signal that represents a steering behavior of the driver or of the vehicle, and/or the third indicator signal is determined utilizing a driving-environment signal that represents a driving-environment situation. In receiving step 425, a driving-situation signal is received that indicates an automated vehicle operation and/or a present driving speed, and/or a type of road, step 415 of determining the drowsiness signal being carried out as a function of the driving-situation signal. In transmitting step 430, a warning signal is output to the driver if, in step 415 of determining the drowsiness signal, the recognized drowsiness of the driver is detected is classified as critical.

The method steps presented here can be carried out repeatedly as well as in a sequence other than the one described.

If an example embodiment includes an "and/or" link between a first feature and a second feature, this is to be read in such a way that the example embodiment according to an example embodiment has both the first feature and the second feature, and according to further example embodiments, has either only the first feature or only the second feature.

What is claimed is:

1. A method performed by a computer processor and for a driver-assistance system of a vehicle, the method comprising:

obtaining at least a first indicator signal that represents a first drowsiness parameter of a driver determined by a first drowsiness-detector of the vehicle and a second indicator signal that represents a second drowsiness parameter of the driver determined by a second drowsiness-detector of the vehicle, wherein the obtaining of the first indicator signal includes determining the first indicator signal based on a head signal that relates to eyes, a face, and/or an attitude of a head of the driver, and the obtaining of the second indicator signal includes determining the second indicator signal based on a steering signal that represents a steering behavior of the driver or of the vehicle;

ascertaining a first validity that is of the first indicator signal and a second validity that is of the second indicator signal;

receiving a driving-situation signal that indicates an automated vehicle operation; and determining a drowsiness signal that represents a detected drowsiness of the driver based on the driving-situation signal, based on the first indicator signal and not on the second indicator signal, and based on the first validity and not on the second validity.

2. The method of claim 1, wherein the driving-situation signal indicates a present driving speed, and/or a type of road.

3. The method of claim 1, wherein the determination of the drowsiness signal includes calculating the drowsiness signal as a function of the first indicator signal when the first validity satisfies a first condition.

4. The method of claim 1, wherein the determination of the drowsiness signal includes calculating the drowsiness signal as a function of the first indicator signal weighted based on the first validity.

5. The method of claim 1, wherein the drowsiness signal is determined using a machine-learned determination rule.

6. The method of claim 1, further comprising outputting a driver warning signal in response to the determined drowsiness signal indicating a driver drowsiness that is classified as critical.

7. The method of claim 1, further comprising:

reading in a third indicator signal that represents a third drowsiness parameter of the driver determined by a third drowsiness-detector of the vehicle; and ascertaining a third validity that is of the third indicator signal, wherein the determining of the drowsiness signal is further based on the third indicator signal and the third validity.

8. The method of claim 7, wherein the determination of the drowsiness signal includes calculating the drowsiness signal as a function of the first indicator signal when the first validity satisfies a first condition and as a function of the third indicator signal when the third validity satisfies a third condition.

9. The method of claim 7, third indicator signal is based on a driving-environment signal that represents a driving-environment situation and/or a driver activity.

10. The method of claim 7, wherein the determination of the drowsiness signal includes calculating the drowsiness signal as a function of the first indicator signal weighted based on the first validity and as a function of the third indicator signal weighted based on the third validity.

11. The method of claim 7, wherein the determination of the drowsiness signal is based on a mean value formed from the first indicator signal and the third indicator signal.

12. A non-transitory computer-readable medium on which are stored instructions that are executable by a processor and that, when executed by the processor, cause the processor to perform a method for a driver-assistance system of a vehicle, the method comprising:

obtaining at least a first indicator signal that represents a first drowsiness parameter of a driver determined by a first drowsiness-detector of the vehicle and a second indicator signal that represents a second drowsiness parameter of the driver determined by a second drowsiness-detector of the vehicle, wherein the obtaining of the first indicator signal includes determining the first indicator signal based on a head signal that relates to eyes, a face, and/or an attitude of a head of the driver, and the obtaining of the second indicator signal includes determining the second indicator signal based on a steering signal that represents a steering behavior of the driver or of the vehicle;

ascertaining a first validity that is of the first indicator signal and a second validity that is of the second indicator signal;

receiving a driving-situation signal that indicates an automated vehicle operation; and determining a drowsiness signal that represents a detected drowsiness of the driver based on the driving-situation signal, based on the first indicator signal and not on the second indicator signal, and based on the first validity and not on the second validity.

13. A control unit comprising a processor, wherein the processor is configured to perform a method for a driver-assistance system of a vehicle, the method comprising:

obtaining at least a first indicator signal that represents a first drowsiness parameter of a driver determined by a first drowsiness-detector of the vehicle and a second indicator signal that represents a second drowsiness parameter of the driver determined by a second drowsiness-detector of the vehicle, wherein the obtaining of the first indicator signal includes determining the first indicator signal based on a head signal that relates to eyes, a face, and/or an attitude of a head of the driver, and the obtaining of the second indicator signal includes determining the second indicator signal based on a steering signal that represents a steering behavior of the driver or of the vehicle;

ascertaining a first validity that is of the first indicator signal and a second validity that is of the second indicator signal;

receiving a driving-situation signal that indicates an automated vehicle operation; and determining a drowsiness signal that represents a detected drowsiness of the driver based on the driving-situation signal, based on the first indicator signal and not on the second indicator signal, and based on the first validity and not on the second validity signal.

\* \* \* \* \*